0## United States Patent Office 3,082,999
Patented Mar. 26, 1963

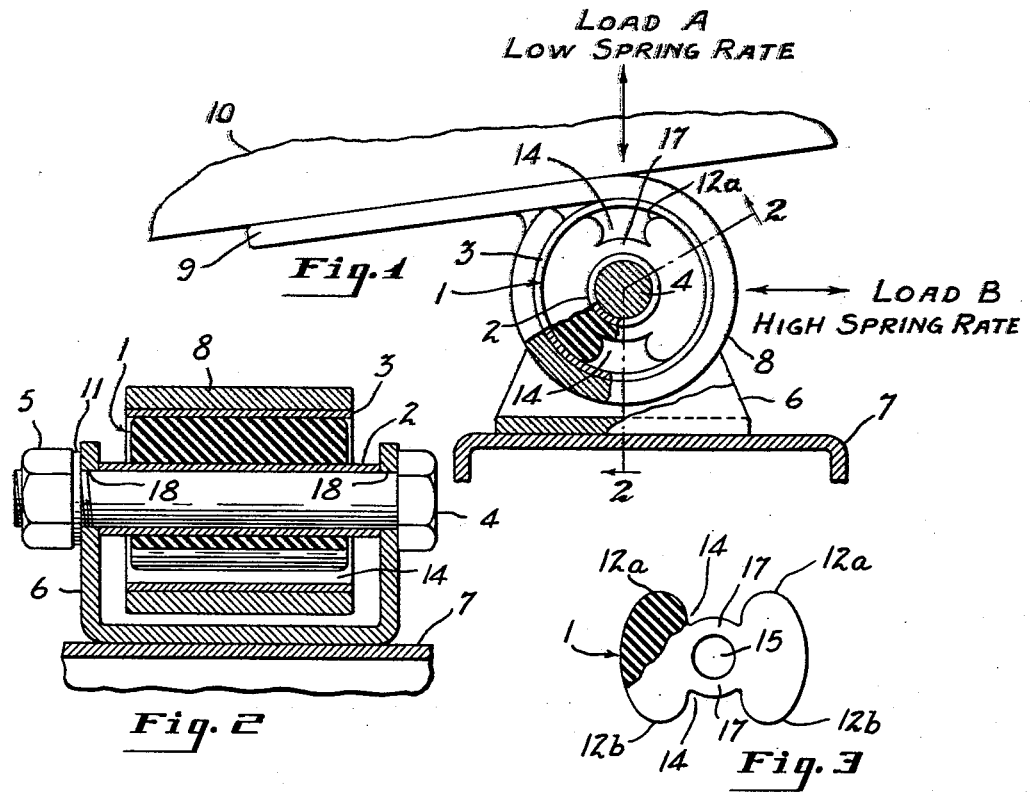
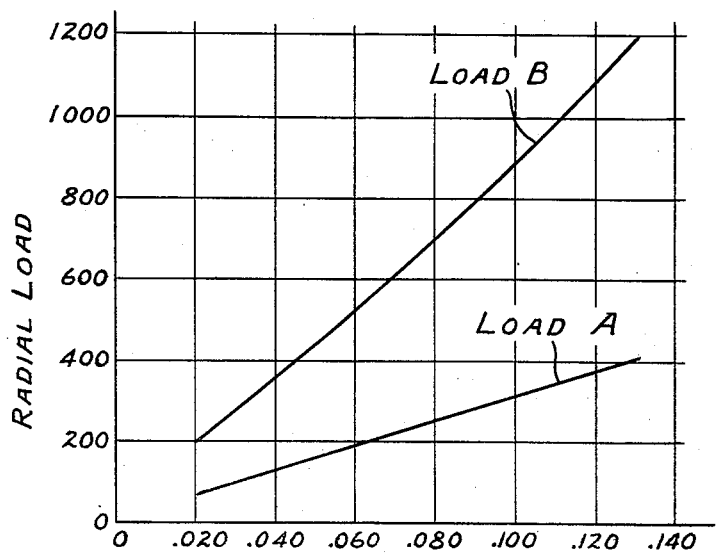

3,082,999
DUAL RATE RUBBER BUSHING
Jack J. Wolf and Keith W. Miller, Logansport, Ind., assignor to The General Tire & Rubber Company, Akron, Ohio, a corporation of Ohio
Filed Nov. 23, 1959, Ser. No. 854,714
1 Claim. (Cl. 267—57)

The present invention relates to articulated rubber bushings of the general type which has a rubber annulus disposed between inner and outer cylindrical members with the rubber annulus being under relatively high axial elongation and radial compression.

U.S. Patent No. 1,782,770 to Leon F. Thiry discloses the general type of articulated rubber blshings with which the present invention is concerned. This type of bushing has been widely and successfully used in automobile suspension systems and in many other installations in which it is necessary or desirable to isolate vibration and provide a flexible connection between two members.

The object of the present invention is to provide an articulated rubber bushing having different spring rates in different radial directions. More specifically, the object of the invention is to provide a rubber bushing in which the spring rate in a first radial direction differs appreciably from the spring rate in a second radial direction at a 90° angle to the first radial direction.

These and other objects will be apparent from the following detailed description of the present invention as illustrated in the accompanying drawing, in which:

FIGURE 1 is a side elevational view, partly in cross-section, of an articulated rubber bushing of the present invention mounted to support the tail shaft housing of the transmission case of an automobile mounted in the rear of the automobile.

FIG. 2 is a longitudinal sectional view taken along lines 2—2 in FIGURE 1 illustrating the elements of the present invention. It should be noted that lines 2—2 are at an oblique angle to each other which is less than 180°.

FIG. 3 is an end view, partly in cross-section, of the rubber annulus used in the bushing of FIG. 1 prior to assembly therein.

FIG. 4 is a graph of the radial loads A and B of FIGURE 1 showing the deflection in inches as the abscissa plotted against the radial loads in pounds as the ordinant.

Referring more particularly to the drawing wherein like parts are indicated by like reference numerals throughout the several views, the articulated rubber bushings of the present invention comprise a rubber annulus 1 disposed between an inner cylinder or sleeve 2 and an outer cylinder or sleeve 3. The rubber annulus is under relatively high axial elongation and radial compression. It may be assembled or positioned between the inner and outer cylinders by the methods and machines shown in U.S. Patents Nos. 2,660,780; 2,690,001 or 2,632,236 or by other methods and machines known in the art.

In the free state and in an end view, the rubber annulus has the dumbbell shape shown in FIG. 3. It also has an internal bore or hole 15 defined therein which has a diameter which is preferably less than the outer diameter of the inner sleeve 2. Adjacent the inner bore 15 of the annulus are two relatively narrow neck portions 17 and facing lobe portions 12 which together define two relieved channel or U-shaped void areas 14 between the lobes. The void areas are opposite or at 180° to each other. The top lobe portions 12a connect to the bottom lobe portions 12b in a convex free curve as shown. The major dimension of the annulus is greater than the inner diameter of the outer cylinder 3 and the length of the annulus, both in the free state and when assembled, is less than the length of the outer cylinder 3.

When the annulus is assembled between the inner and outer cylinders, the void portions 14 between the lobes 12 are somewhat restricted and, in end views, the lobes assume the overlapping curves shown in FIG. 1. As already noted, the rubber of the annulus is under relatively high elongation and radial compression.

An installation of the bushing of the present invention is shown in FIG. 1. Here the unit is mounted inside the eye of a cylindrical attaching bracket 8. The attaching bracket has an integral tongue 9 extending off to the left which supports the tail shaft housing 10 of the transmission case of an automobile engine which is mounted in the rear of an automobile. As shown in FIG. 2, a bolt 4 is placed through the inner cylinder and appropriate holes 18 in a U-shaped bracket 6 mounted on the base support 7. Nut 5 and washer 11 keep the bolt 4 is position and are assembled therewith as shown.

The installation shown illustrates the advantages of the present invention. Radial loads A and B are applied respectively in a vertical direction against the outer cylinder at top void 14 and at the solid rubber annulus 1. Vertical load A has a low spring rate and is relatively soft so as to cushion and absorb vibrations to a considerable extent. Horizontal load B is relatively stiff and hard. The characteristics of load A and load B are plotted in FIG. 4. For a given load, curve A has a deflection which is more than three times greater than the deflection of curve B. Thus the tail shaft housing 10 is supported gently in a vertical direction but is given very positive support in a horizontal direction. In other words, the bushing functions so that load A has a low spring rate and load B has a high spring rate. The bushing of the present invention can, of course, be adopted to other installations in which a dual spring rate is to advantage.

One of the important characteristics of the present invention is the fact that a portion of the radial load directed at or against the void portions 14 is taken by tension in the rubber annulus in the necks 17 or by shear in the body of the annulus 1. In contrast, all of the radial load directed at right angles to the void portions 14 (load B of FIG. 1) is taken in compression by the rubber of the annulus. Inasmuch as the characteristics of rubber in compression and in tension and shear vary considerably, the spring rates and deflections of the rubber bushing of the present invention vary considerably in response to the different loads. As illustrated in the graph of FIG. 4, the radial deflection for a given load applied at the void portions is more than three times that applied elsewhere.

This relationship may be altered somewhat by changing the thickness of the neck portions 17. Reduction of the amount of compression in the rubber also alters the relationship, but this is not desirable because it has a tendency to permit the rubber annulus to rotate relative to the inner and outer cylinders and induce other disadvantages not inherent in this general type of bushing.

If desired, the void portions 14 of the rubber annulus may be painted after assembly with a protective coating to reduce checking and cracking and other deterioration which may occur in use. Furthermore, the void portions 14 may be filled with foam or other material which does not substantially affect the spring rate.

Having thus described our invention, what we claim is:

An articulated dual-rate rubber bushing comprising an outer cylindrical member and an inner cylindrical member and a rubber annulus forced between said outer and inner members, said rubber annulus being under relatively high axial elongation and radial compression and being continuous adjacent the inner member but discontinuous adjacent the outer member and having two void portions of the same size at 180° to each other, said rubber annulus in the free unstressed state having a symmetrical cross-sectional shape similar to a dumbbell and having an internal diameter less than the external diameter of said inner member and an external diameter greater than the internal diameter of said outer member, the lobes at each end of the rubber annulus having a rounded outer surface extending from the thin portion of the annulus radially outwardly to its outer periphery, said outer surface being generated by a convex free curve which is free of sudden changes in curvature.

References Cited in the file of this patent

UNITED STATES PATENTS

| | | |
|---|---|---|
| 2,048,256 | Geyer | July 21, 1936 |
| 2,061,767 | Hobson | Nov. 24, 1936 |

FOREIGN PATENTS

| | | |
|---|---|---|
| 698,771 | Germany | Nov. 16, 1940 |

OTHER REFERENCES

German application 1,038,416, printed Sept. 4, 1958 (Kl 63c 40). (Corresponding U.S. 2,958,526, Nov. 1, 1960.)

German application 1,039,314, printed Sept. 18, 1958 (Kl 47a 17).